(12) United States Patent
Espinoza et al.

(10) Patent No.: US 8,924,860 B2
(45) Date of Patent: Dec. 30, 2014

(54) ADDING EVENTS TO A CALENDAR FROM ANOTHER APPLICATION

(75) Inventors: Tony Espinoza, San Francisco, CA (US); Debra Lavoy, San Jose, CA (US); Ben Quigley, Burlingame, CA (US); Dave Sobotka, Redwood City, CA (US); Mike Sugarbaker, Oakland, CA (US); Mary Wolf, Oak Hill, VA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/618,470

(22) Filed: Sep. 14, 2012

(65) Prior Publication Data

US 2013/0173399 A1 Jul. 4, 2013

Related U.S. Application Data

(60) Continuation of application No. 12/576,883, filed on Oct. 9, 2009, now Pat. No. 8,327,275, which is a division of application No. 10/415,720, filed as application No. PCT/US00/30099 on Oct. 31, 2000, now Pat. No. 7,627,830.

(51) Int. Cl.
*G06F 3/048* (2013.01)
*G06Q 30/02* (2012.01)
*G06F 3/0481* (2013.01)
*G06Q 10/10* (2012.01)

(52) U.S. Cl.
CPC ........ *G06Q 30/0277* (2013.01); *G06F 3/04812* (2013.01); *G06Q 10/109* (2013.01); *Y10S 715/963* (2013.01)
USPC .......................................... 715/752; 715/963

(58) Field of Classification Search
USPC ......... 715/770, 760, 803, 804, 805, 809, 749, 715/963, 765, 748, 712, 785, 802, 823, 854, 715/711, 752
See application file for complete search history.

(56) References Cited

U.S. PATENT DOCUMENTS

| | | | | |
|---|---|---|---|---|
| 5,864,848 | A | * | 1/1999 | Horvitz et al. .................... 1/1 |
| 5,905,246 | A | | 5/1999 | Fajkowski |
| 6,091,956 | A | | 7/2000 | Hollenberg |
| 6,148,331 | A | | 11/2000 | Parry |
| 6,163,803 | A | | 12/2000 | Watanabe |
| 6,167,402 | A | * | 12/2000 | Yeager ............................ 1/1 |
| 6,181,838 | B1 | | 1/2001 | Knowlton |
| 6,208,996 | B1 | * | 3/2001 | Ben-Shachar et al. ............ 1/1 |

(Continued)

FOREIGN PATENT DOCUMENTS

| | | |
|---|---|---|
| EP | 0984370 | 3/2000 |
| WO | WO 00/62226 | 10/2000 |

OTHER PUBLICATIONS

Appelt W. et al., "Effectiveness and efficiency: the need for tailorable user interfaces on the Web", Computer Networks and ISDN Systems, North Holland Publishing. Amsterdam, NL, vol. 30, No. 1-7, Apr. 1, 1998, pp. 499-508, XP004121398, ISSN: 0169-7552, p. 501, col. 1, line 1—col. 2, line 16.

(Continued)

*Primary Examiner* — Steven Sax
(74) *Attorney, Agent, or Firm* — Keller Jolley Preece

(57) ABSTRACT

A method and apparatus is provided that allows a user to automatically add content, such as an event, to a container, such as, a calendar without directly accessing the container. Second and third preferred embodiments are also provided.

20 Claims, 5 Drawing Sheets

(56) References Cited

U.S. PATENT DOCUMENTS

| | | | |
|---|---|---|---|
| 6,253,228 B1 * | 6/2001 | Ferris et al. | 709/203 |
| 6,272,484 B1 | 8/2001 | Martin et al. | |
| 6,310,947 B1 * | 10/2001 | Polcyn | 379/211.01 |
| 6,369,840 B1 * | 4/2002 | Barnett et al. | 715/853 |
| 6,421,653 B1 | 7/2002 | May | |
| 6,496,803 B1 | 12/2002 | Seet et al. | |
| 6,499,021 B1 * | 12/2002 | Abu-Hakima | 706/10 |
| 6,510,461 B1 | 1/2003 | Nielsen | |
| 6,553,341 B1 * | 4/2003 | Mullaly et al. | 704/9 |
| 6,591,244 B2 * | 7/2003 | Jim et al. | 705/7.15 |
| 6,591,295 B1 | 7/2003 | Diamond et al. | |
| 6,594,819 B1 * | 7/2003 | Ciarlante et al. | 717/177 |
| 6,618,775 B1 | 9/2003 | Davis | |
| 6,636,888 B1 | 10/2003 | Bookspan et al. | |
| 6,662,231 B1 * | 12/2003 | Drosset et al. | 709/229 |
| 6,725,203 B1 | 4/2004 | Seet et al. | |
| 6,925,444 B1 | 8/2005 | McCollom et al. | |
| 6,932,270 B1 | 8/2005 | Fajkowski | |
| 6,934,740 B1 * | 8/2005 | Lawande et al. | 709/213 |
| 7,133,834 B1 | 11/2006 | Abelow | |
| 7,167,728 B1 | 1/2007 | Wagner et al. | |
| 7,251,775 B1 | 7/2007 | Astala et al. | |
| 7,286,649 B1 | 10/2007 | Nelson et al. | |
| 7,302,696 B1 | 11/2007 | Yamamoto | |
| 7,376,587 B1 * | 5/2008 | Neofytides et al. | 705/26.35 |
| 7,475,346 B1 | 1/2009 | Bullock et al. | |
| 7,627,830 B1 | 12/2009 | Espinoza et al. | |
| 8,032,913 B1 * | 10/2011 | Pierre et al. | 725/93 |
| 8,327,275 B2 | 12/2012 | Espinoza et al. | |
| 2001/0042078 A1 | 11/2001 | Anwar | |
| 2001/0044797 A1 | 11/2001 | Anwar | |
| 2002/0010623 A1 | 1/2002 | McCollom et al. | |
| 2002/0023001 A1 | 2/2002 | McFarlin et al. | |
| 2002/0059196 A1 | 5/2002 | I'Anson et al. | |
| 2002/0095335 A1 | 7/2002 | Barnett et al. | |
| 2006/0212361 A1 | 9/2006 | Perkowski | |

OTHER PUBLICATIONS

Bentley R. et al., "Basic support for cooperative work on the World Wide Web", International Journal of Human-Computer Studies, Jun. 1997, Academic Press, UK, vol. 46, bo. 6, pp. 827-846, XP002175762, ISSN: 1071-5819, Downloaded from <http://citeseer.nj.nec.com/bentley97basic.html> on the Aug. 7, 2001, p. 833, line 5—p. 834, line 6.
International Search Report dated Sep. 25, 2001 as received in PCT/US00/30099.
Tsuda I. et al., "WorkWare: WWW-based chronological document organizer", Proceedings. 3rd Asia Pacific Computer Interaction 1998 Meeting, Shonan Village Center, Japan, Jul. 15-17, 1998, pp. 380-385, XP002175763, 1998, Los Alamitos, CA, USA, IEEE Comput. Soc, USA, ISBN: 0-8186-8347-3, p. 381, col. 2, line 14—p. 382, col. 1, line 2.
U.S. Appl. No. 10/415,720, filed Jul. 26, 2007, Office Action.
U.S. Appl. No. 10/415,720, filed Dec. 11, 2007, Office Action.
U.S. Appl. No. 10/415,720, filed Jul. 25, 2008, Office Action.
U.S. Appl. No. 10/415,720, filed Jan. 7, 2009, Office Action.
U.S. Appl. No. 10/415,720, filed Jul. 9, 2009, Notice of Allowance.
U.S. Appl. No. 12/576,883, filed Mar. 15, 2012, Office Action.
U.S. Appl. No. 12/576,883, filed Jul. 31, 2012, Notice of Allowance.

* cited by examiner

1. Your CTA ID# [2] —201

What you need: ⦿ Full Service (preview below) ◯ Just the Link
　　　　　　　　　　—202　　　　　　　　　　　　　—203

2. Title [Netscape e-Business] —204
　　　　　　　　　　　　　　　　—205
　　　Date [May ▼] [3 ▼] [2000 ▼]
　　—206
　　　Time [6PM ▼] [:30 ▼] or check for ☐ Untimed Event
　　Duration [1 ▼] hrs [:00 ▼] min　　　　—207
　　　　　　　　—208　　—208

3. Image source [com/images/nc_ha_affiliate.gif] —209
Images must be 50x50 pixels. Enter a full, published URL, i.e.
http://images.myserver.com/dir/subdir/myimage.gif Event description [Learn to bring your business online!]
　　210

Please limit to around 30 words
Text for 1st link [Click Here for More Info] —211
Example: Click here for more information
Source for 1st link [http://home.netscape.com/] —212
Fully qualified URL, example: http://www.myserver.com/dir/too.html
Text for 2nd link [　　　　　] —213
Source for 2nd link [　　　　　] —214

4. [Make/Update CTA Link] —215

[Document Done]

*FIG. 2A*

Text for 1st link [Click Here for More Info] ←211
Example: Click here for more information
Source for 1st link [http://home.netscape.com/] ←212
Fully qualified URL, example: http://www.myserver.com/dir/too/html
Text for 2nd link [ ] ←213
Source for 2nd link [ ] ←214

4. [Make/Update CTA Link] ←215

Preview

The "Full Service" option produces HTML that looks this: Dynamic preview of the "More Info" field is coming soon.

5. |<a href="http://calendar.aol.com/cgi-bin/gx.cgi/Ap ←216

Select and copy this code, then paste into your project.

ADDING EVENTS TO A CALENDAR FROM ANOTHER APPLICATION

CROSS REFERENCE TO RELATED APPLICATIONS

The present application is a continuation of U.S. application Ser. No. 12/576,883, filed Oct. 9, 2009, which is a division of U.S. application Ser. No. 10/415,720, filed Nov. 12, 2003, which is now issued as U.S. Pat. No. 7,627,830, which is a 371 national stage application of international application number PCT/US00/30099, filed Oct. 31, 2000. Each of the aforementioned patent(s) and application(s) are hereby incorporated by reference in their entirety.

BACKGROUND OF THE INVENTION

1. Technical Field

The present invention relates to gathering information and putting the information into associated containers. More particularly, the present invention relates to gathering information from an information source, such as, for example, a Web page, and storing the information in an associated online container, such as, for example, an online calendar, for the convenience of an end-user.

2. Description of the Prior Art

As more and more people use the Internet to attain information relevant to their lives, more Internet tools and utilities are created for such users to help them be better organized. More specifically, Web features of Web products have been created that link with other features of Web products. For example, the generic online address book application operates in this fashion. To with, a user opens an email letter sent to him or her within a particular email application. At that point, the user is provided the opportunity to add the sender's email address to that application's online address book that belongs to the user.

Yahoo! Inc., (Yahoo!) has an online package of applications comprising, for example, a calendar and a bookmarking application. A user can enter event dates and appointments in the calendar, and can enter links to particular Web pages in Yahoo! Bookmarks.

Similarly, 1calendar.com provides an application that calendar-enables a user's events and contact listings. A user can add events or contacts to his or her calendar/addressbook with a single click. 1calendar teaches encoding the required data once, and 1calendar translates it into the required code for each user's favorite application.

L. A. Lisle; S. L. Martin, and J. M. Mullaly, Data processing system for automatic storage of objects of an object type within a logical containment system and method therefor, U.S. Pat. No. 6,104,394 (Aug. 15, 2000) discloses a data processing system, software program and method that effectively and intuitively display a storage space of a data processing system to an end-user to allow the end-user to create a filing system which has an easily usable interface. In implementing this methodology, the user is allowed to simply request that all objects within an entire file system of a data processing system be placed in a logical container. A user sets the parameters for defining the desired characteristics of each of the objects stored within the logical container. Thus, a user is able to organize representations of desired objects in various storage locations without requiring extra steps by a user or excess memory. Furthermore, the contents of a logical container are dynamically updated in real-time to ensure that the filed information is current and accurate. The ability of a user to modify the containment settings and to have such modifications immediately reflected in the logical container rendered on a display device allows a user great flexibility in obtaining a desired graphical user interface.

All of the prior art to date is limited by a specific system environment. For example, Yahoo!'s linkages are all performed within, that is, are limited by, the Yahoo! Community. 1calendar is limited by Web calendars.

It would be advantageous to advance the level of and improve online services provided on the Web by providing functionality on the Web that allows a user to gather content from one Web information source, such as, for example, a Web page, and add the information to any online container of a corresponding type, such as, for example, a calendar, an address book, a shopping list, and the like.

SUMMARY OF THE INVENTION

A method and apparatus is provided that allows a user to automatically add content, such as an event, to a container, such as, a calendar with a single mouse click, and without directly accessing the container. In a second embodiment, the user opens a dialog box to automatically add personalized information, such as an appointment, to the container, such as the calendar, without entering the calendar application. In a third embodiment, an advertisement banner having an associated entity, such as, for example, an electronic coupon, scrolls horizontally across a Web page, and when the user clicks on the entity on the banner, a copy of the entity is placed in the user's associated container, such as, for example, a shopping list, without the user having to click to the container's site.

BRIEF DESCRIPTION OF THE DRAWINGS

FIGS. 2a and 2b are screen prints of the tool, according to a preferred embodiment of the invention;

FIG. 3 is a screen print of an appointment corresponding to entries in the tool in FIGS. 2a and 2b, according to the invention.

DETAILED DESCRIPTION OF THE INVENTION

A method and apparatus is provided that allows a user to automatically add content, such as an event, to a container, such as, a calendar with a single mouse click, and without directly accessing the container. In a second embodiment, the user opens a dialog box to automatically add personalized information, such as an appointment, to the container, such as the calendar, without entering the calendar application. In a third embodiment, an advertisement banner having an associated entity, such as, for example, an electronic coupon, scrolls horizontally across a Web page, and when the user clicks on the entity on the banner, a copy of the entity is placed in the user's associated container, such as, for example, a shopping list, without the user having to click to the container's site.

It is noted herein that in the appropriate context, the terms, link, insert, and logo are used interchangeably.

In the first preferred embodiment, a click-to-add invention makes it easy for channels, brands, partners, and individuals to integrate with a generic container application, such as, for example, a calendar application. From a user's perspective, the click-to-add invention taught herein allows the user to easily, quickly, and without disruption add content information, such as, for example, dates and events from World Wide Web (Web) sites to the user's container, such as, for example, a calendar. From channels', brands', and partners' perspectives, the invention herein is a valuable promotional tool. The invention makes channel, brand, partner, and an individual's content more relevant to the user, and encourages traffic to be driven or directed from the container application to the channel's, brand's, partner's, and individual's respective Web sites.

Figure 1:
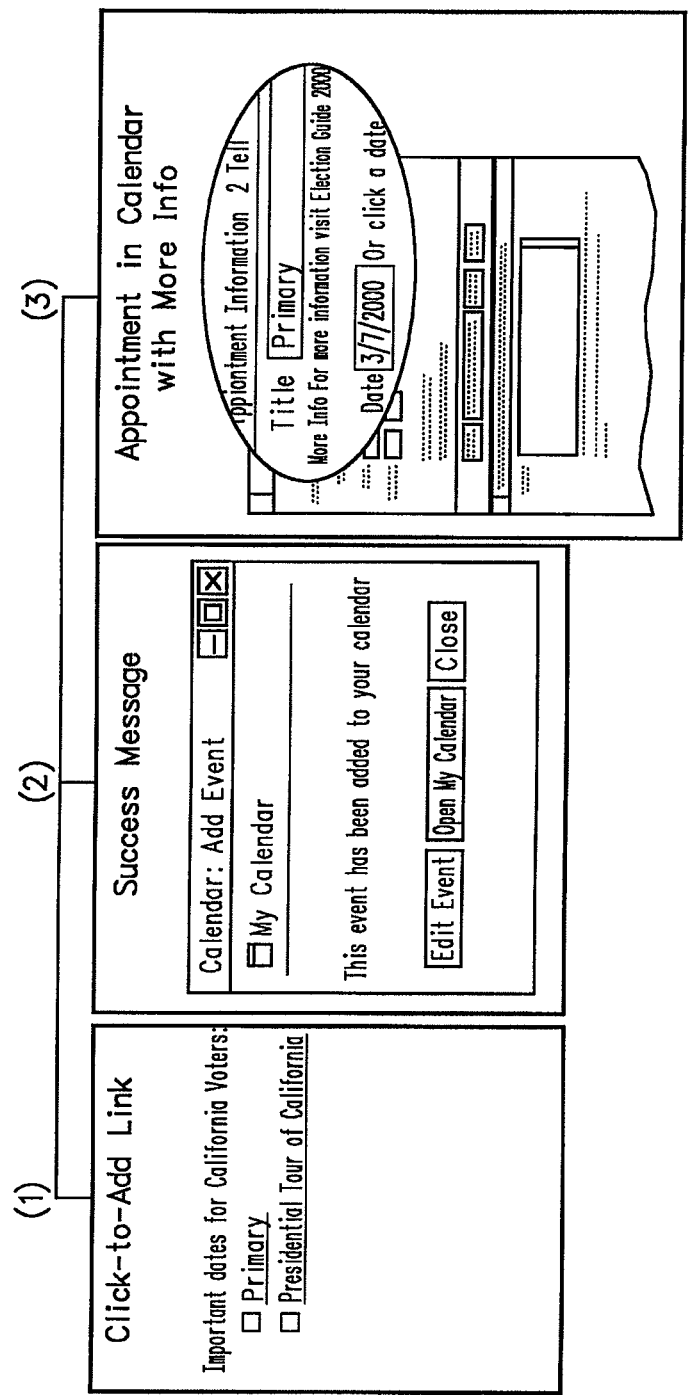
FIG. 1 shows a flow diagram from a user's perspective, according to the invention.

FIG. 1 shows a flow diagram of an implementation from a user's perspective, according to the invention. In one preferred embodiment, a partner has placed a click-to-add link or insert beside an event on a page on their Web site. At some later point in time, a user clicks on the event (1), and the event is added to the user's personal calendar. A small success message (2) is displayed subsequently and provides the user an option to link to the personal calendar, from wherein the user can open the added event (3). A link back to the partner's site from the added event is provided according to the invention, and is shown in the magnified image.

It is noted that in the preferred embodiment, channels, brands, partners, and individuals can add text, images, or hyperlinks but are by no means limited to these common programming objects. Specifically, in one embodiment, a More Info section is suggested as a conventional place within which to add the programming objects cited herein above.

Example 1

Again, referring to FIG. 1, a user clicks on a click-to-add insert (1). The event is added to the user's calendar and a small success message pops up in the upper left hand corner of an election guide page (2). The user stays within the election guide page, but has the option to go to the calendar. When the user chooses to go to the calendar, the user sees the event, as well as a link, such as in the More Info section, that serves the purpose of driving or directing the user back into the content, i.e. the election guide page.

It is noted that implementing the click-to-add invention claimed herein on a Web site is easy, and comprises four main steps. The four steps are requesting a click-to-add partner identifier (ID) from an appropriate account manager; going to a proprietary Web site to access a tool for creating an insert, also referred to herein as a link, when creating one link at a time; filling in the fields of the tool; and publishing the link, or the insert. For producing a relatively large quantity of links at a time, an alternative embodiment is taught herein below.

In the preferred embodiment, the ID is used to identify and track the effectiveness of click-to-add promotions.

In the preferred embodiment, the tool provides an option to create links for Web pages that are not proprietary Web pages, i.e. that are business partners' Web pages, and the tool provides an option to create links for proprietary Web pages, such as, for example, America OnLine Web pages.

FIGS. 2a and 2b are screen prints of the tool, according to a preferred embodiment of the invention. The first category of fields comprises a click-to-add ID 201 and a choice of two options: full service 202 or link only 203. The full service option 202 allows the user to enter more detailed content information, while the link only option 203 only allows the user to enter link information. Following is a second category of information, comprising the various entry fields: title 204; date 205; time 206; untimed event 207; and duration 208. Following is a third category of information, comprising the main HTML block: the image source field 209 which is for a full, published entered URL and wherein referenced images must be 50×50 pixels; an event description field 210; an entry field for the text for a first link 211; an entry field for the source URL of the first link 212; an entry field for the text for a second link 213; and an entry field for the source URL of the second link 214. Following is a fourth category comprising an initiator, specifically, a click-to-add link button 215, for publishing the insert, or URL, according to the invention. Following is a fifth category comprising an output text field 216, specifically showing the resulting URL according to the invention. Herein below is a more detailed description of a preferred embodiment the tool.

Detail Description of Fields of an Implementation of a Preferred Embodiment of the Tool Title. Names the title of an associated event. It is preferred to be unique and descriptive to avoid being out of context the next time a viewer reads or sees it. This is a required field. Example: 8 p.m. ET: Season Finale of "XXXXX," on XYZ.

Time. It is noted that while in the preferred embodiment, times are not translated for different time zones, the functionality to translate for different time zones is an improvement within the scope of the invention. If an event is national, or is expected to be viewed in different time zones at the same time, for example, the World Series game airing, the event is marked as an untimed event. The associated time and time zones are added to the title field. For example, the title field could read, Live World Series game airing at 8 p.m. ET/5 p.m. PT. This is not a required field.

Date. The event is added to users' calendars on this date. This is a required field.

Duration. Add the duration in this field if the duration of the event is known. If the duration is not known, this field is left blank.

Event Description. Text description of the event is added here.

Image. A selected image on a Web site or any other image that can be referenced on the appointment page is added here. The image is 50×50 pixels and is published somewhere on the Web site where it going to stay for some time to avoid users referencing broken images on an appointments page, for example.

Create Links. The first link field is for containing a link to a page where a user can find more useful or additional information. The second link field comprises text that will be hyper-linked to this useful page with more or additional information. It is preferred that the link be descriptive of the page to which it links.

Submit, Test, and Output. After all of the desired information is entered, the information is submitted. An "Add this to My Calendar" link is displayed. A user can click on this link to preview and test how the link works. The process is iterative. That is, if the link does not display all of the information in an appointment as intended, then return to the tool and edit the information, resubmit once again, and retest the link. When the test is satisfactory, the HTML code that is displayed in an Output field is ready for publishing on the Web site.

Example 2

It is noted that in the preferred embodiment, fields in the tool used to create the links and inserts correspond simply to fields in the container. For example, fields in a click-to-add link correspond simply to fields in an appointment.

Figure 3:
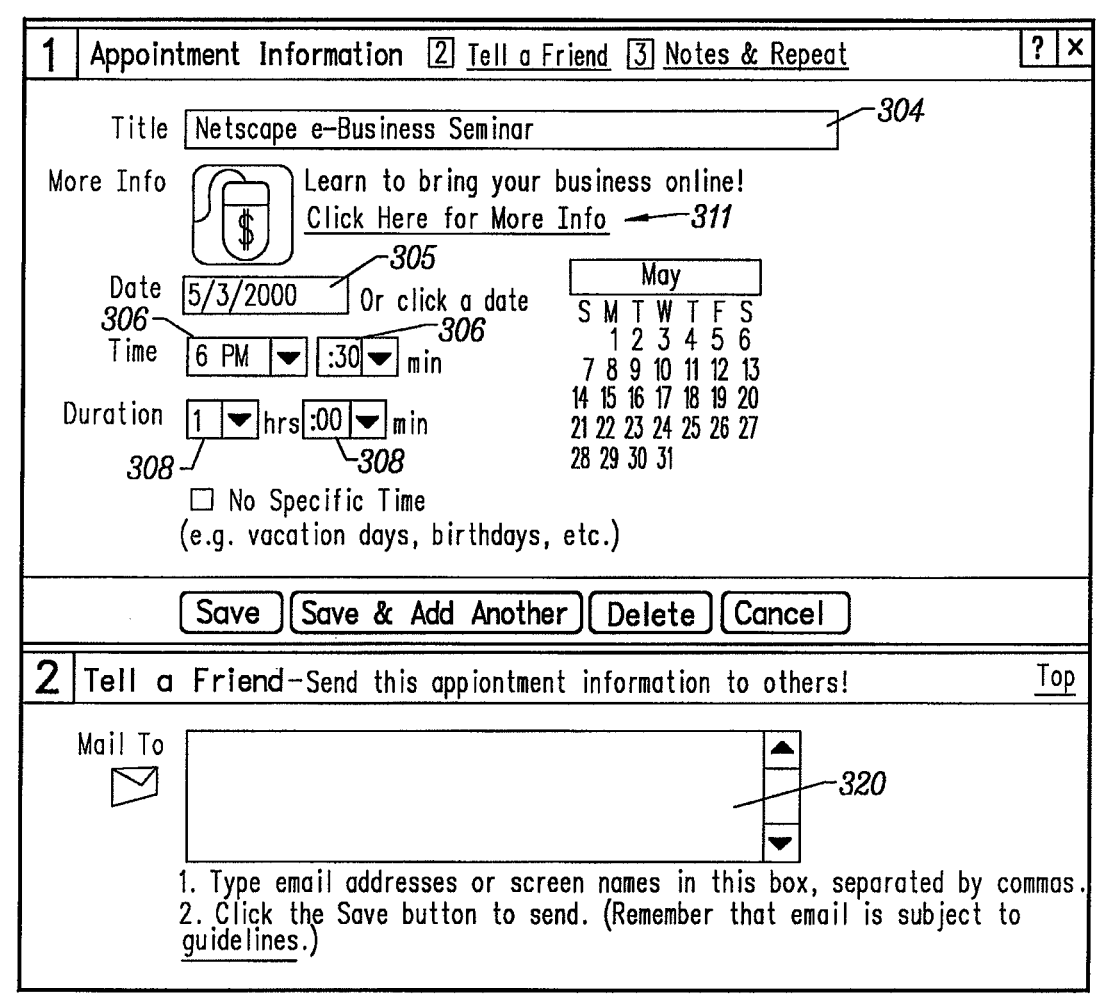

FIG. 3 is a screen print of an appointment information page corresponding to entries in the tool in FIGS. 2a and 2b, according to an implementation of a preferred embodiment of the invention. A first section shows corresponding fields Title 304, Date 205, Time 206, Duration 208, and, the first link, Click Here for More Info 311. The appointment page allows a wide variety of other functionality and options, such as, for example, a Tell a Friend section wherein a user can type in email addresses or screen names in a box 320.

Publishing the Insert or Link.

The preferred embodiment allows for a wide variety of means for publishing the insert or link. Listed below are suggested examples, but the invention is by no means limited to such suggested examples:

Give the link or insert to the webmaster of the Web page containing the content;

Highlight the HTML code in the Output field, copy it, and give the copied HTML code to the webmaster to publish on the Web site; and Have users embed the HTML code in the Web page as follows:

Highlight the HTML code in the Output field;

Copy the HTML code;

Paste the insert or link beside or underneath a promotion for an event on the user's HTML page; and Publish the page on the Web site, and be ready to have end-users add the event to their calendars.

An Important Note About Inserting.

In the preferred embodiment, when placing links or inserts on a channel, brand, or partner page, the links or inserts are required to be faithful to the proprietor's brand. Following in Table A is an example displaying two options for placing click-to-add inserts behind a calendar logo. It is appreciated that the example is by no means limited to the container being a calendar.

TABLE A

| Option A: | Option B: |
|---|---|
| Create a Key and Single Calendar Logos | Skip the Key, Create All-In-One Logo/Links |
| The key explains what the single logos are and what they do. | The button itself explains the feature and displays the Calendar logo. |
| Example of the Key: | Example of the Button: |
| Add these appointments to My Calendar ™ by clicking the . |  Add this to My Calendar ™<br>Place this beside or under events to be added to Calendars. |
| This should appear at the top or bottom of any page that carries the Calendar button. | |
| Place the Calendar buttons (that the key describes) beside or under events to be added to Calendars. | |
| The button would look like this. | |
|  | |

It is noted that in an implementation of a preferred embodiment, the Full Service option available in the click-to-add (CTA) tool creates a small chunk of HTML that includes the CTA link, as well as the My Calendar logo.

Technical Guidelines for Producing Dynamic Container-Ready Links.

In the preferred embodiment, if a lot of published links or inserts are desired on a particular Web site that may be impractical to create with the publishing tool cited herein above, the following information is given to a software engineer to use to create the claimed links or inserts for any and every event on the Web site in an automatic fashion.

It is noted that the project described herein is by no means limited to the click-to-add embodiment, but can be applied in a much broader context without deviating from the scope and spirit of the invention.

Description of Click-to-Add Projects.

The channel, brand, partner, or individual must pass URLs to a container, such as, a calendar in order to allow users to access the content, such as, for example, scheduling appointments in personal calendars. No matter how these URLs are generated on a page, they must be constructed in a particular manner, described herein below in the section entitled, Parameters for Created URLs.

Starting a Click-to-Add Project.

The preferred embodiment comprises the steps herein below:

Design a Click-to-Add program, such as where inserts appear on the Web site, what information they will contain, and the like;

Request a partner id number;

If added appointments are of a specific type exclusively, ask for a type ID number; and Follow the parameters according to predetermined construction, such as those within this document, to create the links or inserts on the Web site.

Parameters for Created URLs.

In the preferred embodiment, the claimed URLs, such as, for example, the CTA URLs must conform to a specific construction in order for the data therein to pass properly to the intended containers, such as, for example, personal calendars. Total character length of the URLs should not exceed 1000 characters. URLs greater in length may be truncated.

A list of required URL elements in an implementation of a preferred embodiment are as follows in Table B.

Table B

1. DNS Root: http://calendaraol.com/cgi-bin/gx.cgi/AppLogic+XA?_W=CTA;

2. Partner ID: _ID=n, wherein n is a specific identification number. It is noted that if these links are to be published on Rainman pages, then n must be preceded by 0. That is, the parameter is required to read, _ID=0n, wherein n is the partner identification number given. Otherwise, if the links are going to be simply on HTML pages, then do not precede the partner ID number with 0;

3. Date: _D=MM/DD/YYYY, wherein if month or day is a single digit, precede with a zero;

4. Time: Use either a or b herein below:
   a. _H=HH&_M=MM, if the event takes place at a specific time, or
   b. _H=NT, if the event does not occur at a specific time during the day, or if the time of day is put in the title as text;

5. Event Type: _ET=<event type>;

6. Title: _T=<text>, wherein up to 60 characters is recommended, and the entire URL must be equal to or less than 1000 characters;

7. Information: _I=<text>, wherein up to 525 characters recommended. It is important that the information goes last, so that if the URL is over 1000 characters, then something in the information will be cut short rather than a piece of the URL that is actually essential for the link to work.

Optional Fields

8. Duration Hour: _DH=; and
9. Duration Minute: _DM=;

It is noted that the URLs are constructed using these items, and that each should be separated by an "&". See example herein below. The URLs should be constructed in the order shown above, each current one appended to the last.

The following is also noted:

1. Do not put targets in URLs;
2. Certain characters do not work in URLs. For instance, a URL cannot contain spaces. Substitutes must be used for these types of characters. Following is a sample list of suggested substitutes.

| | |
|---|---|
| Spaces | %20 or + |
| Colons | %3A |
| Commas | %2C |
| # | %23 |
| Semicolon | %3B |
| $ | %24 |
| % | %25 |
| ! | %21 |
| & | %26 |
| ( | %28 |
| ) | %29 |
| ? | %3F |
| " | %22 |
| < | %3C |
| > | %3E |
| Line Break | %20 (See next section, Section 4.) |

3. The character % OD occurs when line breaks are escaped in links. This character breaks CTA links, therefore, it is recommended to avoid this character in links.

OPTIONAL: Allowing Users to Generate Some of the Information for CTA Links.

In another preferred embodiment, partners choose to allow users to generate some of the information created in the links and inserts, such as, for example, the click-to-add links.

While allowing users to generate some of the information in the link is an exciting application of invention, such as, for example, the click-to-add embodiment, there is nevertheless an important item with which to be careful. That is, when users insert line breaks into a field, such as, for example, an Event Description or any other field, most scripts will transform the line break into a default character in the resulting URL. The default character typically is % OD.

The % OD character breaks links, such as, for example, the claimed click-to-add links. Therefore, when implementing the interactive CTA feature comprising the functionality to incorporate user input, either the user is prohibited to enter line breaks in the fields via, for example, a pop-up that reminds the user to remove line breaks, or by overriding the % OD character with some other character or set of characters in the resulting CTA link, such as, for example, %20, which is a space.

More on Programming Information into Added Appointments.

In the preferred embodiment, regular text or HTML text can be placed into a Notes field of the claimed URL, following substitution rules, such as, for example, those cited herein above. Following is an example of guidelines for an implementation of a preferred embodiment.

Plain or HTML text information is displayed in a More Info field just below the title on added appointments. HTML text can include links back to the Web site. Referenced images are no larger than 50×50 pixels in size. An example of such HTML text is provided in a sample URL herein below;

The More Info field is restricted to 60 pixels in height and 265 pixels in width;

HTML characters, such as, for example, <and > should be escaped in the URL according to the characters cited herein above; and All <open> commands must be </closed>, except for <br>, <img src>, and <p>. Any <open> commands that are not closed will cause the URL to be truncated just before the unclosed <open> command.

Example of Created URL.

Herein below in Table B is a sample URL according to the invention, and constructed with the following information embedded in it.

Table B

Event Details
Title: One Wild and Crazy Netscape Event
Date: Dec. 31, 2000
Time: 11:30 pm
Duration: 1 hour
Partner ID Number: 15
More Information Details
Image: http://home.netscape.com/images/nc_ha_AIM30.gif
Text for event description: This is going to be one wild and crazy Netscape event. You will not want to miss it!
Text for a link: Click here for more Netscape information.
Link back to partner site: http://www.netscape.com\

Sample URL

Following is the URL created by inputting the above event information into the claimed tool:

http://calendar.aol.com/cgi-bin/gx.cgi/AppLogic+XA?_W=CTA&_ET=0&_ID=15&_D=12/31/2000&_H=23&_M=30&_DH=1&_DM=00&_T=One+Wild+and+Crazy+Event&_I=%3Ctable+border%3D0%3E%3Ctr+valign%3Dtop%3E%3Ctd%3E%3Cimg+src%3Dhttp%3A//home.netscape.com/images/nc_ha_AIM30.gif+height%3D50+width%3D50+alt%3D%22%22%3E%3C/td%3E%3Ctd%3E%3Cfont+size%3D1+face%3DArial%3EThis+is+going+to+be+one+wild+and+crazy+Netscape+event.++You+will+not+want+to+miss+it%21%3Cbr%3E%3Cbr%3E%3Ca+href%3Dhttp%3A//www.netscape.com%3EClick+here+for+more+Netscape+information.%3C/a%3E%3C/font%3E%3C/td%3E%3C/tr%3E%3C/table%3E Embedded within the URL link herein above is the event information and the More Information in an HTML format for display in an added appointment. The HTML tags are escaped in order to pass to the calendar in the URL.

It is noted that the claimed URL herein, as sampled herein above, instead of taking a user away to another Web site or Web page, the URL adds value to a client's product, because from the client's end-user's perspective, the URL serves to add the client's information into the user's container.

It is noted that the claimed invention herein provides a way for end-users to collect information of a certain type into the end-users' particular container.

Jot-it-Down.

Jot-it-Down is a second preferred embodiment of the invention. Jot-it-Down behaves as a dynamic click-to-add. That is, the claimed URL is created dynamically.

Figure 4:
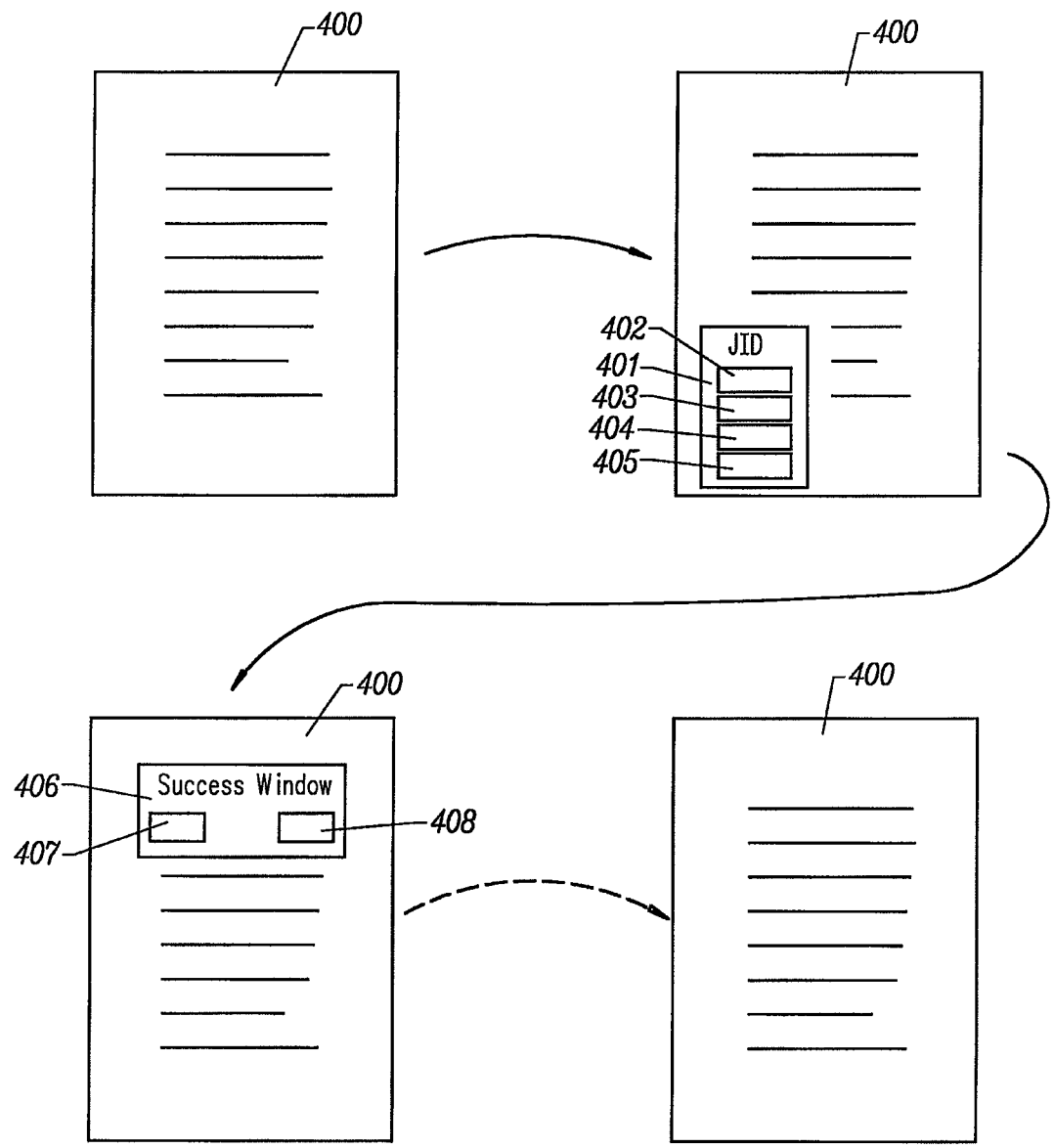
FIG. 4 shows a flow diagram of the use of the Jot-it-Down embodiment.

FIG. 4 shows a flow diagram of the use of the Jot-it-Down embodiment. A user clicks the Jot-it-Down link from a Web page 400 and a pop up window 401 opens. The pop up window comprises input fields (402-405) for the user to input information. Examples of such input fields are title, date, time, and notes. After the user enters the desired information, including notes, the user then closes the Jot-it-Down pop up window. Shortly thereafter, a success window 406 opens stating that the user-entered information has been successfully added to the desired container and providing the user with two options (407 and 408). The first option is the user closes the success window and defaults to remaining at the Web page 400. The second option is from the success window, the user links to the container.

An application of the Jot-it-Down (JID) embodiment of the invention is a company decides what information is put in the pop up JID window. Then, when the employee clicks on the JID link, the predetermined information by the company is put into the employee's container.

Add Banner.

Add Banner is a third preferred embodiment of the invention. An advertisement banner having an associated entity, such as, for example, an electronic coupon scrolls horizontally across a Web page, and when the user clicks on the entity on the banner a copy of the entity is placed in the user's associated container, such as, for example, a shopping list, without the user having to click to the container's site. It is noted that clicking the link on the banner puts the entity in the user's entity container. From a technical perspective, functionality is added to Add Banner.

In the preferred embodiment, the Add Banner feature also provides a success window the use thereof results in two options for the user. The first option is the user closes the success window and remains on the current Web page. The second option is the user links from the success window to the appropriate container.

An example of a container in the Add Banner embodiment of the invention is a shopping list. In this example, the user's workflow is not disrupted, because the user has the option to click-to-add a desired coupon to the user's shopping list, instead of the user having to link to the corresponding merchant's Web site.

It is noted that all three significant preferred embodiments of the invention provide a success indicator, which comprises, but is not limited to, a first option directing the end-user to a container, and a default option, wherein the end-user remains at the original information source, such as, for example, a Web page.

It is noted that there are four typical types of users:
Internal partners;
external partners;
any product; and
any individual.

It is noted that the use of the invention claimed herein provides an important advantage to the user in that it does not disrupt the user's workflow.

It is noted that the invention provides a link for the user from the container to the original information source, such as, for example, an original Web page or Web page corresponding to an entity, such as, for example, a coupon in the Add Banner embodiment.

It is noted that beyond the standard links and logos, a wide variety of implementation options of the invention herein is possible as well as practical.

Accordingly, although the invention has been described in detail with reference to particular preferred embodiments, persons possessing ordinary skill in the art to which this invention pertains will appreciate that various modifications and enhancements may be made without departing from the spirit and scope of the claims that follow.

The invention claimed is:

1. A method comprising:
identifying a message with information associated with a user event;
providing, in the message, a selectable element associated with the user event that allows for the user event to be added to an electronic calendar application, the message being provided to a user in a first graphical user interface;
detecting, by at least one processor, a user selection of the selectable element provided in the message;
upon detecting the user selection of the selectable element provided in the message, providing a second graphical user interface including one or more input fields for information related to the user event;
detecting, using the at least one processor, a user confirmation of information in the one or more input fields; and
upon detecting the user confirmation of the information in the one or more input fields, creating, by the at least one processor, an entry in the electronic calendar application corresponding to the user event based on the information, wherein the entry is created in the electronic calendar application without opening the electronic calendar application.

2. The method as recited in claim 1, wherein the first graphical user interface is associated with a first application, the first application differing from the electronic calendar application.

3. The method as recited in claim 2, wherein the first application comprises an Internet browser.

4. The method as recited in claim 1, wherein the selectable element comprises an icon.

5. The method as recited in claim 1, wherein the selectable element comprises text.

6. The method as recited in claim 5, wherein the text comprises a description of the user event.

7. The method as recited in claim 1, wherein the one or more input fields comprise a title input field, a date input field, and a time input field.

8. The method as recited in claim 7, further comprising auto-filling the title input field, the date input field, and the time input field upon providing the second graphical user interface.

9. The method as recited in claim 7, further comprising receiving an input from the user for the title input field, the date input field, and the time input field.

10. A method comprising:
identifying a message of a first application associated with an event that a user can attend or otherwise participate in, the message including information related to the event;
providing a selectable element associated with the event in the message that allows for the event to be added to an electronic calendar application, the message and the selectable element being provided to the user in a first graphical user interface;
detecting, by at least one processor, a user selection of the selectable element provided in the message;
upon detecting the user selection of the selectable element provided in the message, providing a second graphical user interface including one or more input fields for information related to the event;
detecting, using the at least one processor, a user confirmation of information in the one or more input fields; and
upon detecting the user confirmation of the information in the one or more input fields, creating by the at least one processor, an entry in the electronic calendar application corresponding to the event based on the information, wherein the entry is created in the electronic calendar application without opening the electronic calendar application, and the electronic calendar application differs from the first application.

11. The method as recited in claim 10, wherein the first application comprises an Internet browser.

12. The method as recited in claim 10, wherein the selectable element comprises an icon.

13. The method as recited in claim 10, wherein the selectable element comprises text.

14. The method as recited in claim 13, wherein the text comprises a description of the event.

15. The method as recited in claim 10, further comprising providing a user interface portion indicating that the event has successfully been entered in the electronic calendar application.

16. The method as recited in claim 15, wherein the user interface portion comprises one or more of a title, a date, and a time of the event.

17. The method as recited in claim 16, wherein the user interface portion allows a user to modify one or more of the title, the date, and the time of the event.

18. A non-transitory computer readable storage media storing instructions thereon that, when executed by a processor, cause a computer system to:
identify a message with information associated with a user event;
provide, in the message, a selectable element associated with the user event that allows for the user event to added to an electronic calendar application, the message being provided to a user in a first graphical user interface;
detect a user selection of the selectable element provided in the message;
provide a second graphical user interface including one or more input fields upon detecting the user selection of the selectable element provided in the message;
detect a user confirmation of information in the one or more input fields; and
create an entry in the electronic calendar application corresponding to the user event based on the information upon detecting the user confirmation of the information in the one or more input fields, wherein the entry is created in the electronic calendar application without opening the electronic calendar application.

19. The non-transitory computer readable storage media as recited in claim 18, wherein the instructions, when executed by the processor, further cause the computer system to provide a user interface portion indicting that the user event has successfully been entered in the electronic calendar application, wherein the user interface portion comprises one or more of a title, a date, a time of the user event, and allows the user to modify one or more of the title, the date, and the time of the user event.

20. The non-transitory computer readable storage media as recited in claim 18, wherein the one or more input fields comprise a title input field, a date input field, and a time input field; and the instructions, when executed by the processor, further cause the computer system to auto-fill the title input field, the date input field, and the time input field upon providing the graphical user interface.

* * * * *